(12) United States Patent
Seok (10) Patent No.: US 10,218,553 B2
(45) Date of Patent: *Feb. 26, 2019

(54) METHOD AND DEVICE FOR TRANSMITTING DATA UNIT IN WLAN

(71) Applicant: LG ELECTRONICS INC., Seoul (KR)

(72) Inventor: Yongho Seok, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/965,601

(22) Filed: Apr. 27, 2018

(65) Prior Publication Data

US 2018/0248728 A1 Aug. 30, 2018

Related U.S. Application Data

(63) Continuation of application No. 15/109,087, filed as application No. PCT/KR2014/005412 on Jun. 19, 2014, now Pat. No. 9,985,814.

(60) Provisional application No. 61/922,066, filed on Dec. 30, 2013.

(51) Int. Cl.
*H04L 27/26* (2006.01)
*H04L 29/08* (2006.01)
*H04L 29/06* (2006.01)
*H04W 84/12* (2009.01)

(52) U.S. Cl.
CPC ........ *H04L 27/263* (2013.01); *H04L 27/2602* (2013.01); *H04L 69/22* (2013.01); *H04L 69/321* (2013.01); *H04L 69/323* (2013.01); *H04L 69/324* (2013.01); *H04W 84/12* (2013.01)

(58) Field of Classification Search
CPC . H04L 27/263; H04L 27/2602; H04L 69/323; H04L 69/321; H04L 69/324; H04W 84/12
See application file for complete search history.

(56) References Cited

U.S. PATENT DOCUMENTS 7,061,427 B2    6/2006  Hoffmann et al.
9,985,814 B2 *  5/2018  Seok ..................... H04L 27/263
2009/0323610 A1 12/2009 Gaddam et al.
(Continued)

FOREIGN PATENT DOCUMENTS

KR   10-2007-0048087 A   5/2007
WO   2011/099687 A1      8/2011
WO   2011/108832 A2      9/2011

OTHER PUBLICATIONS

U.S. Appl. No. 15/109,087, Office Action dated Oct. 18, 2017, 12 pages.
(Continued)

*Primary Examiner* — Mohammad S Anwar
(74) *Attorney, Agent, or Firm* — Lee Hong Degerman Kang & Waimey (57) ABSTRACT

Disclosed are a method and a device for transmitting data unit in a WLAN. A method for transmitting data unit in a WLAN comprises: a step of an STA generating a PPDU; and a step of the STA transmitting the PPDU to an access point (AP), wherein the PPDU comprises a first field and a second field, wherein the first field is transmitted on the basis of a first IFFT and the second field is transmitted on the basis of a second IFFT.

8 Claims, 7 Drawing Sheets

(56) References Cited

U.S. PATENT DOCUMENTS

2012/0263157 A1 10/2012 Porat
2013/0107912 A1 5/2013 Ponnampalam
2016/0337153 A1 11/2016 Seok

OTHER PUBLICATIONS

PCT International Application No. PCT/KR2014/005412, International Search Report dated Sep. 24, 2014, 1 page.

* cited by examiner

METHOD AND DEVICE FOR TRANSMITTING DATA UNIT IN WLAN

CROSS-REFERENCE TO RELATED APPLICATIONS

This application is a continuation of U.S. patent application Ser. No. 15/109,087, filed on Jun. 29, 2016, now U.S. Pat. No. 9,985,814, which is the National Stage filing under 35 U.S.C. 371 of International Application No. PCT/KR2014/005412, filed on Jun. 19, 2014, which claims the benefit of U.S. Provisional Application No. 61/922,066, filed on Dec. 30, 2013, the contents of which are all hereby incorporated by reference herein in their entirety.

BACKGROUND OF THE INVENTION

Field of the Invention

The present invention relates to wireless communications, and more particularly, to a method and a device for transmitting a data unit in a wireless local area network (WLAN).

Related Art

A station (STA) supporting the Institute of Electrical and Electronics Engineers (IEEE) 802.11a standard may have a transmission rate of up to 54 MPs when transmitting data through a 20 MHz channel bandwidth in a 5 GHz frequency band based on orthogonal frequency division multiplexing (OFDM).

The STA supporting the IEEE 802.11n standard may have a transmission rate of up to 600 MPs when transmitting data through a 20 or 40 MHz channel bandwidth in a 2.4 or 5 GHz frequency band based on multiple-input and multiple-output (MIMO).

The IEEE 802.11a standard is aimed at providing a 1 Gbps or greater throughput in a medium access control (MAC) service access point (SAP) layer. A wireless local area network (WLAN) system supporting the IEEE 802.11ac standard may also referred to as a very high throughput (VHT) system. For a 1 Gbps or greater throughput in the MAC SAP layer, the VHT system may support 80/160 MHz channel bandwidths and eight spatial streams (or space-time streams). When the VHT system supports a 160 MHz channel bandwidth, up to eight spatial streams, 256-quadrature amplitude modulation (QAM), and a short guard interval (GI), an STA supporting the VHT system may have a transmission rate of up to 6.9 Gbps when transmitting data in a physical layer.

To satisfy the foregoing throughput, a plurality of VHT STAs supporting the VHT system may simultaneously transmit and receive data through the same channel in communications with an access point (AP). The VHT AP may simultaneously transmit data to the plurality of VHT STAs based on space division multiple access (SDMA) or MU-MIMO. That is, data may be simultaneously transmitted or received between the plurality of VHT STAs and the VHT AP.

Currently, with an increasing demand for high-quality multimedia transmission, unlicensed frequency bands tend to expand. Further, channel bandwidths used for the existing WLAN standard make it difficult to secure contiguous 160 MHz channel bandwidths for IEEE 802.11ac. Therefore, IEEE 802.11ac may use 160 MHz channel bandwidths of aggregated non-contiguous channels.

SUMMARY OF THE INVENTION

An aspect of the present invention is to provide a method of transmitting a data unit generated based on different sizes of inverse fast Fourier transforms (IFFTs) in a wireless local area network (WLAN).

Another aspect of the present invention is to provide a device which performs a method of transmitting a data unit generated based on different sizes of IFFTs in a WLAN.

To achieve the aforementioned purposes of the present invention, a method of transmitting a data unit in a WLAN according to one aspect of the present invention may include generating, by a station (STA), a physical layer convergence procedure (PLCP) protocol data unit (PPDU); and transmitting, by the STA, the PPDU to an access point (AP), wherein the PPDU may include a first field and a second field, the first field may be transmitted based on a first inverse fast Fourier transform (IFFT), and the second field may be transmitted based on a second IFFT.

To achieve the aforementioned purposes of the present invention, an STA transmitting a data unit in a WLAN according to another aspect of the present invention may include a radio frequency (RF) unit configured to transmit or receive a radio signal; and a processor selectively connected to the RF unit, wherein the processor may be configured to generate a PPDU and to transmit the PPDU to an AP, the PPDU may include a first field and a second field, the first field may be transmitted based on a first IFFT, and the second field may be transmitted based on a second IFFT.

By using a PPDU generated based on different IFFTs, efficiency of medium access control (MAC)/physical (PHY) layers may be improved and data throughput and frequency efficiency may be increased in the IEEE 802.11 WLAN.

DESCRIPTION OF EXEMPLARY EMBODIMENTS

Figure 1:
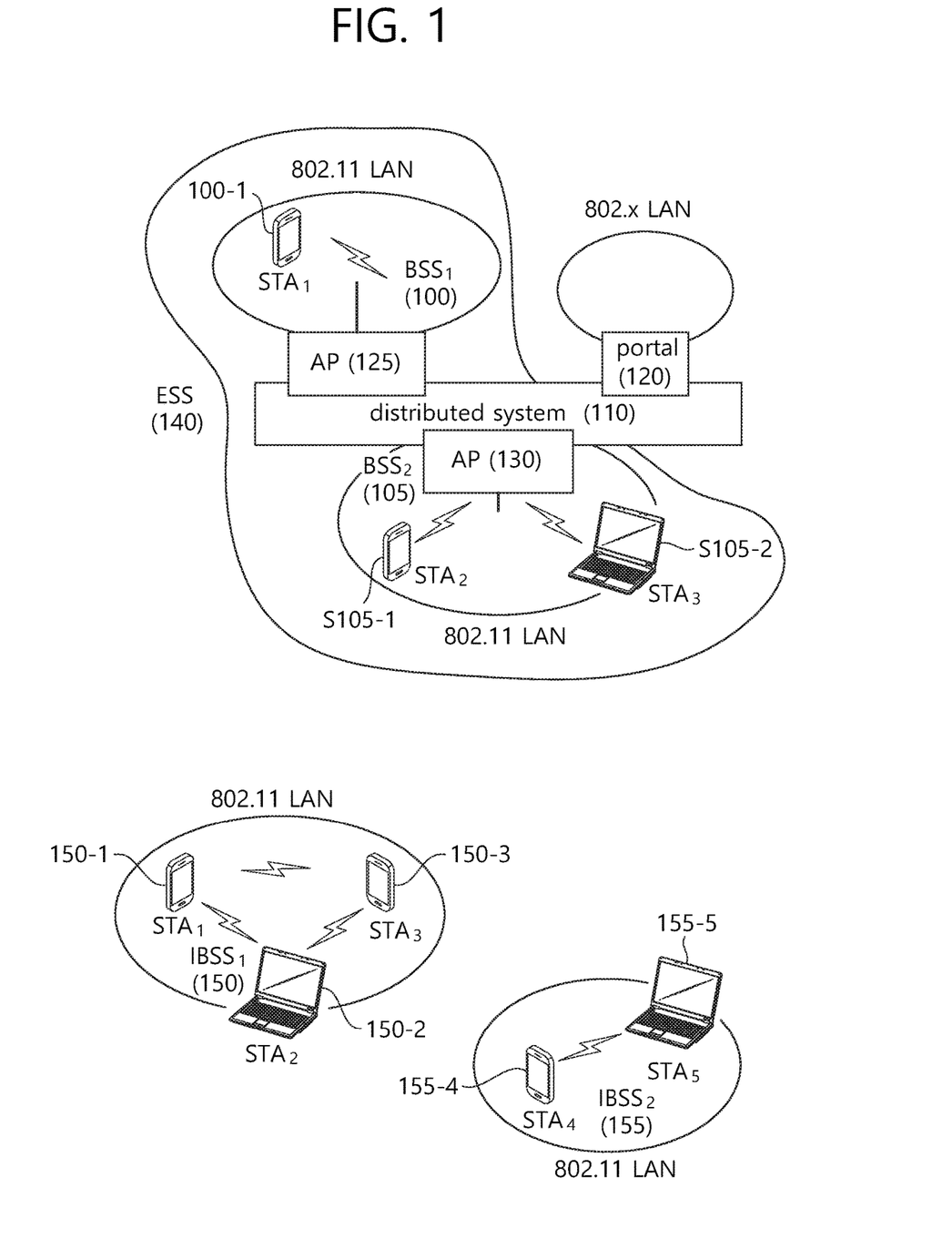
FIG. 1 is a conceptual view illustrating a structure of a wireless local area network (WLAN).

FIG. 1 is a conceptual view illustrating a structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
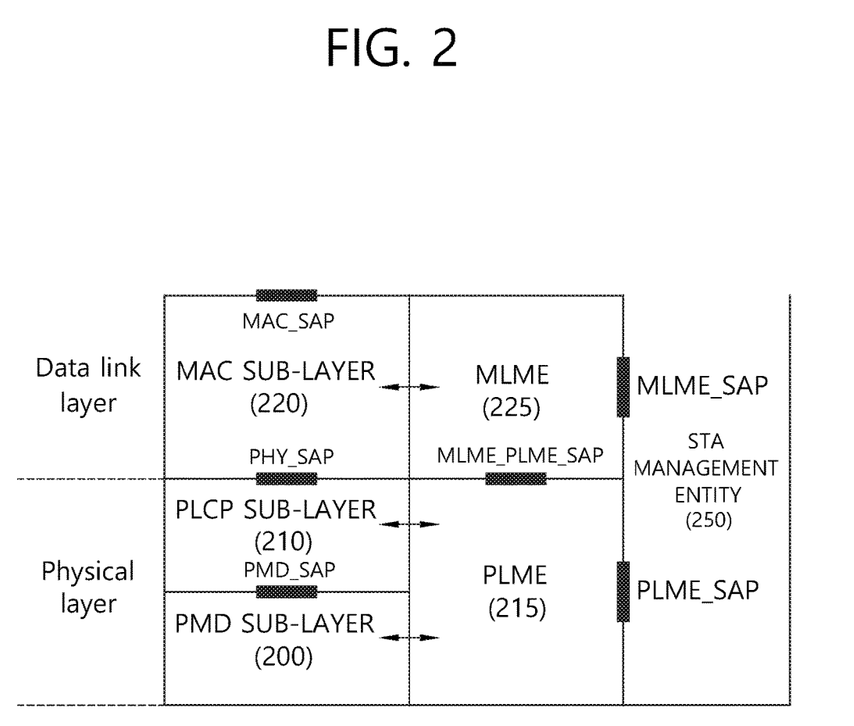
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Hereinafter, embodiments of the present invention illustrate operations of a very high throughput (VHT) system supporting IEEE 802.11ac in a 2.4 GHz industrial, scientific and medical (ISM) frequency band.

The VHT system may support an 80 MHz channel bandwidth or 160 MHz channel bandwidth in a 5 GHz frequency band. Further, the VHT system may support eight spatial streams (or space-time streams) and 256-quadrature amplitude modulation (QAM). However, when the VHT system operates in a 2.4 GHz frequency band, it is difficult to support an 80 MHz channel bandwidth and/or 160 MHz channel bandwidth. Thus, when the VHT system mostly operates in a 2.4 GHz frequency band, communications between an AP and an STA may mostly be performed through a 20 MHz channel bandwidth or 40 MHz channel bandwidth.

Therefore, when communications between an AP and an STA are performed through a 20 MHz channel bandwidth or 40 MHz channel bandwidth, it is important to improve efficiency of medium access control (MAC)/physical (PHY) layers of the AP and/or STA. An embodiment of the present invention illustrates a VHT system using a 256 inverse fast Fourier transform (IFFT), instead of an existing 64 IFFT, based on a 20 MHz channel bandwidth. Further, an embodiment of the present invention illustrates a VHT system using a 512 IFFT, instead of an existing 128 IFFT, based on a 40 MHz channel bandwidth. Hereinafter, the embodiments of the present invention mostly illustrate a method of using an IFFT with a changed size for a PPDU transmitted via a 20 MHz channel bandwidth or 40 MHz channel bandwidth in a 2.4 GHz frequency band. However, an IFFT with a changed size may also be used for a PPDU transmitted via an 80 MHz channel bandwidth or 160 MHz channel bandwidth in a 5 GHz frequency band, and this embodiment is also included in the scope of the present invention.

In a VHT system operating in a 2.4 GHz frequency band according to an embodiment of the present invention, the length of a guard interval (GI) between OFDM symbols may be 0.8 us or 0.4 us depending on a wireless local area network (WLAN) environment at OFDM modulation based on a 256 IFFT or 512 IFFT. In this case, time resources assigned for a GI between OFDM symbols may relatively be reduced. Thus, throughput may be increased by about 30% as compared with existing IEEE 802.11n. Hereinafter, the VHT system supporting PPDUs generated based on different sizes of IFFTs is described in detail.

Figure 3:
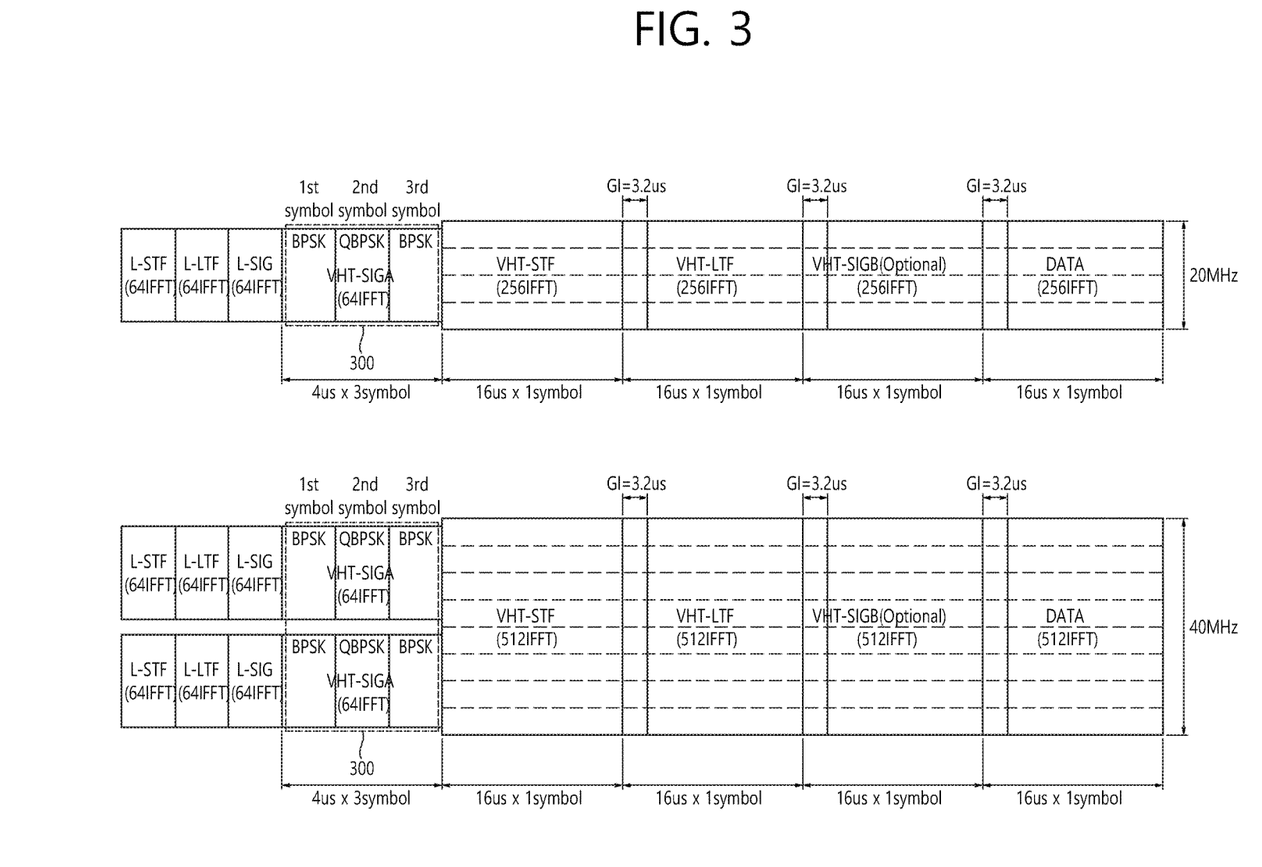
FIG. 3 is a conceptual view illustrating a PPDU supporting a VHT system according to an embodiment of the present invention.

FIG. 3 is a conceptual view illustrating a PPDU supporting a VHT system according to an embodiment of the present invention.

An upper part of FIG. 3 illustrates a PPDU for communications between an AP and an STA at a 20 MHz channel bandwidth in the VHT system.

A lower part of FIG. 3 illustrates a PPDU for communications between an AP and an STA at a 40 MHz channel bandwidth in the VHT system.

A legacy-short training field (L-STF), a legacy-long training field (L-LTF), and a legacy-signal (L-SIG) may be transmitted for backward compatibility with a legacy STA supporting an existing WLAN system (for example, IEEE 802.11g/n and the like).

The L-STF may include a short training orthogonal frequency division multiplexing (OFDM) symbol. The L-STF 300 may be used for frame detection, automatic gain control (AGC), diversity detection, and coarse frequency/time synchronization.

The L-LTF may include a long training OFDM symbol. The L-LTF may be used for fine frequency/time synchronization and channel estimation.

The L-SIG may be used to transmit control information. The L-SIG may include information on data rate and data length.

Specifically, the L-SIG may carry information on transmission times for VHT related signals and a PSDU to be subsequently transmitted to prevent a collision with a PPDU transmitted from a legacy STA and to protect the PSDU.

Conventionally, the L-STF, the L-LTF, and the L-SIG may be transmitted on OFDM symbols and subcarriers generated based on a 64 IFFT.

For the L-SIG, 48 subcarriers among 64 subcarriers generated based on the 64 IFFT may be used to transmit L-SIG data. 16 subcarriers, other than the 48 subcarriers used to transmit the L-SIG among the 64 subcarriers, may be used for a pilot signal and a channel boundary. Four of the 16 subcarriers may be used for a pilot and remaining 12 subcarriers may be used as a guard for a channel bandwidth boundary.

A VHT-SIG-A 300 may include pieces of information for encoding/decoding a PSDU. For example, the VHT-SIG-A 300 may include information on a bandwidth, a modulation and coding scheme (MCS), the number of spatial streams, a partial association identifier (AID), a group identifier (ID), space-time block coding (STBC), beamforming, coding bits, and the like. Detailed description of the pieces of information included in the VHT-SIG-A 300 is provided in Table 22-12—Fields in the VHT-SIG-A field of 22.3.8.3.3 VHT-SIG-A Definition of IEEE Standard for Information technology telecommunications and information exchange between systems local and metropolitan area networks specific requirements "Part 11: Wireless LAN Medium Access Control (MAC) and Physical Layer (PHY) Specifications Amendment 4: Enhancements for Very High Throughput for Operation in Bands below 6 GHz" (hereinafter, IEEE 802.11 ac specifications).

For example, the VHT-SIG-A 300 may include information for interpreting a VHT PPDU. The VHT-SIG-A 300 may include a VHT-SIG-A1 and a VHT-SIG-A2. The VHT-SIG-A1 may include bandwidth information on a used channel, information on whether space-time block coding is applied, a group identifier (ID) indicating an STA group for multi-user (MU)-multiple-input and multiple-output (MIMO) transmission, and information on the number of used streams.

The VHT-SIG-A2 may include information on whether a short guard interval (GI) is used, forward error correction (FEC) information, information on an MCS for a single user, information on channel coding types for multiple users, beamforming related information, redundancy bits for cyclic redundancy checking (CRC), and tail bits of a convolutional decoder.

A VHT-STF may be used to improve automatic gain control estimation in an MIMO environment.

A VHT-LTF may be used for channel estimation in an MIMO environment.

A VHT-SIG-B may include information on each STA, that is, information on PSDU length and a MCS, tail bits, or the like.

The VHT-SIG-A 300, a filed defined above in Table 22-12—Fields in the VHT-SIG-A field of 22.3.8.3.3 VHT-SIG-A Definition of the IEEE 802.11 ac standard, may be transmitted on two OFDM symbols. That is, subfields of the VHT-SIG-A 300 may be transmitted on two OFDM symbols.

The VHT-SIG-A 300 included in the PPDU supporting the VHT system according to the embodiment of the present invention may be transmitted on three OFDM symbols (first, second, and third OFDM symbols). That is, existing two OFDM symbols (first and second OFDM symbols) and an additional OFDM symbol as a third OFDM symbol may be used for transmission of the VHT-SIG-A 300. The third OFDM symbol may be used to support a change of an IFFT size on one PPDU. According to the embodiment of the present invention, an IFFT size for OFDM symbols for transmission of fields (VHT-STF, VHT-LTF, VHT-SIG-B, and DATA (data field)) after the VHT-SIG-A 300 may be changed and the third OFDM symbol for the VHT-SIG-A 300 may be used as an IFFT size or FFT size transition margin. For example, when the STA transmits the PPDU, the third OFDM symbol may be used as an FFT size transition margin for demodulation by the AP.

Specifically, in the 20 MHz channel bandwidth, a 64 IFFT may be used for transmission of the VHT-SIG-A 300 and fields before the VHT-SIG-A 300 and a 256 IFFT may be used for transmission of fields after the VHT-SIG-A 300.

In the 40 MHz channel bandwidth, a 64 IFFT may be used for transmission of the VHT-SIG-A 300 and fields before the VHT-SIG-A 300 and a 512 IFFT may be used for transmission of fields after the VHT-SIG-A 300.

Providing a description based on the 20 MHz channel bandwidth, an interval between corresponding subcarriers in use of the 64 IFFT may be different from an interval between corresponding subcarriers in use of the 256 IFFT. An interval between subcarriers may be referred to as subcarrier spacing. Thus, a transition margin for demodulation by a receiving STA may be needed corresponding to changed subcarrier spacing in the PPDU. The third OFDM symbol for the VHT-SIG-A 300 may serve as a transition margin. According to the embodiment of the present invention, a random specific sequence or specific field may be transmitted on the third OFDM symbol for the VHT-SIG-A 300. For example, a CRC and a tail on the first OFDM symbol and the second OFDM symbol may be replaced with a CRC and a tail transmitted on the third OFDM symbol.

When the IFFT size is changed from a 64 IFFT to a 256 IFFT and subcarrier spacing is changed, the receiving STA may immediately perform demodulation corresponding to the changed subcarrier spacing for transmission of one PPDU. In this case, the third OFDM symbol for transmission of the VHT-SIG-A 300 may be omitted and the VHT-SIG-A 300 may be transmitted on the two OFDM symbols.

In order that the third OFDM symbol for the VHT-SIG-A 300 serves as a transition margin, the receiving STA may need to receive the first OFDM symbol and the second OFDM symbol of the VHT-SIG-A 300 to detect a VHT preamble and to acquire information on spacing between subcarriers for OFDM symbols and information on a GI between OFDM symbols, which are transmitted subsequently to the VHT-SIG-A.

Figure 4:
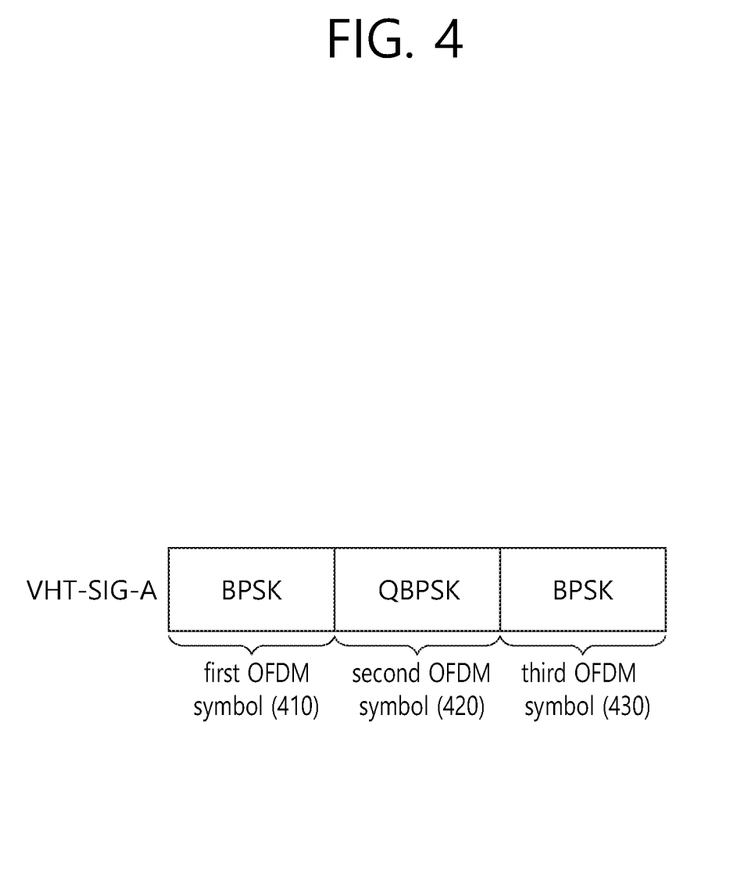
FIG. 4 is a conceptual view illustrating a VHT-SIG-A of a PPDU according to an embodiment of the present invention.

FIG. 4 is a conceptual view illustrating a VHT-SIG-A of a PPDU according to an embodiment of the present invention.

FIG. 4 illustrates modulation symbols transmitted on three OFDM symbols 410, 420, and 430 for the VHT-SIG-A.

A modulation symbol transmitted on a first OFDM symbol 410 may be generated based on binary phase shift keying (BPSK).

A modulation symbol transmitted on a second OFDM symbol 420 may be generated based on quadrature binary phase shift keying (QBPSK).

A modulation symbol transmitted on a third OFDM symbol 430 may be generated based on BPSK.

BPSK may be a modulation scheme based on a constellation of binary data mapped on the real axis. Meanwhile, QBPSK may be a modulation scheme of mapping binary data on the imaginary axis. BPSK and QBPSK may have a phase difference of 90°. QBPSK may have a constellation rotated counterclockwise by 90° based on that for BPSK. That is, a constellation for the modulation symbol on the second OFDM symbol 420 for transmission of the VHT-SIG-A may be a QBPSK constellation rotated counterclockwise by 90° from a constellation for the modulation symbol on the first OFDM symbol 410 for transmission of the VHT-SIG-A.

A receiving STA may detect whether a VHT preamble is transmitted based on phases of the modulation symbols transmitted on the first OFDM symbol 410 and the second OFDM symbol 420 for transmission of the VHT-SIG-A.

A field which is transmitted previously on the first OFDM symbol 410 and the second OFDM symbol 420 may be transmitted on the third OFDM symbol 430 for transmission of the VHT-SIG-A. For example, an MCS, CRC, tail, and the like for data may be transmitted on the third OFDM symbol 430. In this case, an MCS, CRC, tail, and the like, which are transmitted previously on the first OFDM symbol 410 and the second OFDM symbol 420, may be transmitted instead on the third OFDM symbol 430. That is, CRCs and tails on the first OFDM symbol 410 and the second OFDM symbol 420 may be replaced with a CRC and tail transmitted on the third OFDM symbol 430. Detecting an error in information transmitted on the first OFDM symbol 410, the second OFDM symbol 420, and the third OFDM symbol 430 may be performed based on the CRC on the third OFDM symbol 430.

In a PPDU supporting a VHT system, an L-STF, an L-LTF, an L-SIG, and a VHT-SIG-A may preferentially be transmitted. When communications between an AP and an STA are performed through a 20 MHz channel bandwidth, the L-STF, the L-LTF, the L-SIG, and the VHT-SIG-A may be transmitted on OFDM symbols generated based on a 64 IFFT.

When communications between the AP and the STA are performed through a 40 MHz channel bandwidth, data on the OFDM symbols generated based on the 64 IFFT in the 20 MHz bandwidth may be duplicated in another 20 MHz bandwidth to be transmitted through the 40 MHz channel bandwidth. That is, transmission of the L-STF, the L-LTF, the L-SIG, and the VHT-SIG-A may be duplicated every 20 MHz channel bandwidth in the 40 MHz channel bandwidth. To reduce a peak-to-average power ratio (PAPR) of a signal transmitted in the 40 MHz channel bandwidth, {1,j} phase modulation may be performed on data transmitted in each 20 MHz channel bandwidth of the 40 MHz channel bandwidth.

After the VHT-SIG-A, a VHT-STF, a VHT-LTF, a VHT-SIG-B, and a DATA field may be transmitted. When communications between the AP and the STA are performed through the 20 MHz channel bandwidth, the VHT-STF, the VHT-LTF, the VHT-SIG-B, and the DATA field may be transmitted on OFDM symbols generated based on a 256 IFFT.

When communications between the AP and the STA are performed through the 40 MHz channel bandwidth, the VHT-STF, the VHT-LTF, the VHT-SIG-B, and the DATA field may be transmitted on OFDM symbols generated based on a 512 IFFT.

When the IFFT size increases by four times from 64 to 256 in the same channel bandwidth, the length of OFDM symbols may increase from 4 us to 16 us. Further, when the IFFT size increases by four times from 64 to 256 in the same channel bandwidth, the length of a GI may also increase from 0.8 us to 3.2 us.

As described above, the VHT-STF may be used for frequency offset estimation and phase offset estimation. The VHT-LTF may be used for channel estimation for decoding the VHT-SIG-B and the DATA field. One, two, four, six, or eight VHT-LTFs may consecutively be transmitted through one PPDU depending on the number of transmitted spatial streams.

The VHT-SIG-B may selectively be included in the PPDU. For example, the VHT-SIG-B may include user-specific information (for example, an MCS, length information, and the like) on a PPDU transmitted via MU-MIMO or OFDMA.

If the VHT-SIG-A may be transmitted through three OFDM symbols and the VHT-SIG-B information may be transmitted through the VHT-SIG-A, the VHT-SIG-B may not be transmitted. Detailed description of pieces of information transmitted through the VHT-SIG-B is provided in Table 22-14 Fields in the VHT-SIG-B field of 22.3.8.3.6 VHT-SIG-B Definition of the IEEE 802.11 ac specifications.

When the channel bandwidth is 20 MHz, the VHT-STF, the VHT-LTF, the VHT-SIG-B, and the DATA field generated based on the 256 IFFT may be transmitted in such a form that a VHT-STF, a VHT-LTF, a VHT-SIG-B, and a DATA field transmitted based on the 256 IFFT in a 80 MHz channel bandwidth in the IEEE 802.11ac 5 GHz VHT system is subjected to ¼ down-clocking to match with the 20 MHz channel bandwidth.

Due to ¼ down-clocking, the length of OFDM symbols may increase by four times. That is, the duration of one OFDM symbol in a ¼ down-clocked frame may be 16 us, four times the duration of one OFDM symbol in an existing PPDU having not been subjected to ¼ down-clocking, which is 4 us.

When the channel bandwidth is 40 MHz, the VHT-STF, the VHT-LTF, the VHT-SIG-B, and the DATA field generated based on the 512 IFFT may be transmitted in such a form that a VHT-STF, a VHT-LTF, a VHT-SIG-B, and a DATA field transmitted based on the 512 IFFT in a 160 MHz channel bandwidth in the IEEE 802.11ac 5 GHz VHT system is subjected to ¼ down-clocking to match with the 40 MHz channel bandwidth.

The sequence of the VHT-LTF for the 256 IFFT transmitted through the 80 MHz channel bandwidth in the IEEE 802.11ac 5 GHz VHT system is as follows.

$$VHTLTF_{-122,122} = \{LTF_{left}, 1, LTF_{right}, -1, -1, -1, 1, 1, -1,$$
$$1, -1, 1, 1, -1, LTF_{left}, 1, LTF_{right},$$

$$1, -1, 1, -1, 0, 0, 0, 1, -1, -1, 1$$

$$LTF_{left}, 1, LTF_{right}, -1, -1, -1, 1, 1, -1, 1, -1, 1, 1, -1, LTF_{left}, 1, LTF_{right}\}$$

$$LTF_{left} = \{1, 1, -1, -1, 1, 1, -1, 1, -1, 1, 1, 1, 1, 1, 1, -1, -1, 1, 1, 1, -1, 1, 1, 1, 1, 1\}$$

$$LTF_{right} = \{1, -1, -1, 1, 1, -1, 1, -1, 1, -1, -1, -1, -1, 1, 1, 1, -1, -1, 1, 1, -1, -1, 1, 1, 1, 1\} \quad \text{[Equation 1]}$$

According to the embodiment of the present invention, the VHT-LTF sequence for the 256 IFFT illustrated in Equation 1 may be transmitted through the 20 MHz channel bandwidth via ¼ down-clocking.

The sequence of the VHT-LTF for the 512 IFFT transmitted through the 160 MHz channel bandwidth in the IEEE 802.11ac 5 GHz VHT system is as follows in Equation 2.

$$VHTLTF_{-250,250} = \{VHTLTF_{-122,122}, 0, 0, 0, 0, 0, 0, 0, 0, 0, 0, 0, 0, VHTLTF_{-122,122}\} \quad \text{[Equation 2]}$$

According to the embodiment of the present invention, the VHT-LTF sequence for the 512 IFFT illustrated in Equation 2 may be transmitted through the 40 MHz channel bandwidth via ¼ down-clocking.

A pilot sequence for the 256 IFFT transmitted, regarding transmission of the DATA field, through the 80 MHz channel bandwidth in the IEEE 802.11ac 5 GHz VHT system is as follows in Equation 3.

$$p_n^{\{-103,-75,-39,-11,11,39,75,103\}} = \{\Psi_{n \bmod 8}, \Psi_{(n+1) \bmod 8}, \ldots, \Psi_{(n+7) \bmod 8}\}$$

$$p_n^{k \in \{-103,-75,-39,-11,11,39,75,103\}} = 0 \quad \text{[Equation 3]}$$

Here, $\Psi_m$ is illustrated below in Table 1.

TABLE 1

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | −1 | −1 | 1 | 1 | 1 |

Pilot mapping $P_n^k$ for subcarrier k for symbol n illustrates a mapping relationship between a pilot sequence and a subcarrier. In transmission through the 80 MHz channel bandwidth, eight pilot tones may be transmitted through subcarriers corresponding to subcarrier indices −103, −75, −39, −11, 11, 39, 79, and 103.

According to the embodiment of the present invention, the pilot sequence illustrated in Equation 3 may be transmitted through the 20 MHz channel bandwidth via ¼ down-clocking.

A pilot sequence for the 512 IFFT transmitted through the 160 MHz channel bandwidth in the IEEE 802.11ac 5 GHz VHT system may have a repeated form in two 80 MHz channel bandwidths included in the 160 MHz channel bandwidth.

The pilot sequence for the 512 IFFT transmitted, regarding transmission of the DATA field, through the 160 MHz channel bandwidth in the IEEE 802.11ac 5 GHz VHT system is as follows in Equation 4.

$$p_n^{\{-231,-203,-167,-139,-117,-89,-53,-25,25,53,89,117,139,167,203,231\}}$$

$$= \{\Psi_{n \bmod 8}, \Psi_{(n+1) \bmod 8}, \Psi_{(n+2) \bmod 8}, \Psi_{(n+3) \bmod 8}, \Psi_{(n+4) \bmod 8}, \Psi_{(n+5) \bmod 8}, \Psi_{(n+6) \bmod 8}, \Psi_{(n+7) \bmod 8},$$

$$\Psi_{n \bmod 8}, \Psi_{(n+1) \bmod 8}, \Psi_{(n+2) \bmod 8}, \Psi_{(n+3) \bmod 8}, \Psi_{(n+4) \bmod 8}, \Psi_{(n+5) \bmod 8}, \Psi_{(n+6) \bmod 8}, \Psi_{(n+7) \bmod 8}\}$$

$$p_n^{k \in \{-231,-203,-167,-139,-117,-89,-53,-25,25,53,89,117,139,167,203,231\}} = 0 \quad \text{[Equation 4]}$$

Here, $\Psi_m$ is illustrated above in Table 1.

According to the embodiment of the present invention, the pilot sequence illustrated in Equation 4 may be transmitted through the 40 MHz channel bandwidth via ¼ down-clocking.

As described above, according to the embodiment of the present invention, to improve efficiency in the MAC layer and/or PHY layer some fields transmitted in the 20 MHz channel bandwidth may be generated based on the 256 IFFT, instead of the existing 64 IFFT. Further, some fields transmitted in the 40 MHz channel bandwidth may be generated based on the 512 IFFT, instead of the existing 64 IFFT.

When the 256 IFFT and 512 IFFT are used, a GI between OFDM symbols may be increased from 0.8 us to 3.2 us. According to the embodiment of the present invention, when the GI between OFDM symbols is reduced to 0.8 us, throughput may be improved as compared with in the existing WLAN.

Figure 5:
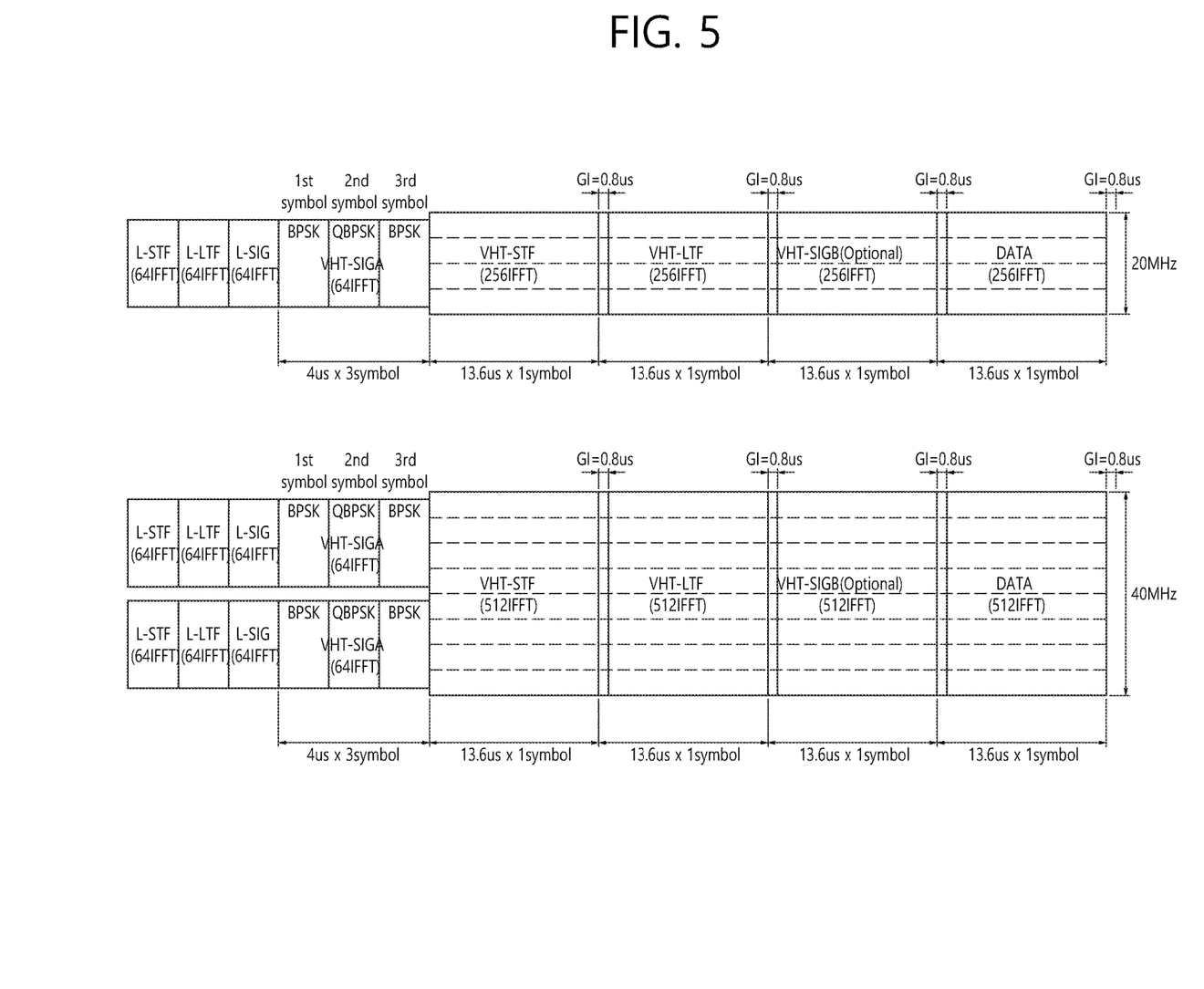
FIG. 5 is a conceptual view illustrating a PPDU supporting a VHT system according to an embodiment of the present invention.

FIG. 5 is a conceptual view illustrating a PPDU supporting a VHT system according to an embodiment of the present invention.

FIG. 5 illustrates a GI with reduced duration between OFDM symbols transmitting a VHT-STF, a VHT-LTF, a VHT-SIG-B, and a DATA field generated based on the 256 IFFT in a PPDU in the VHT system. The duration of the GI may be reduced from 3.2 us to 0.8 us.

When the duration of the GI is reduced from 3.2 us to 0.8 us, duration of an OFDM symbol for each of the VHT-STF, the VHT-LTF, the VHT-SIG-B, and the DATA field is reduced from 16 us to 13.6 us, thus securing a relatively large quantity of time resources for data transmission. Accordingly, additional throughput gains may be acquired.

Figure 6:
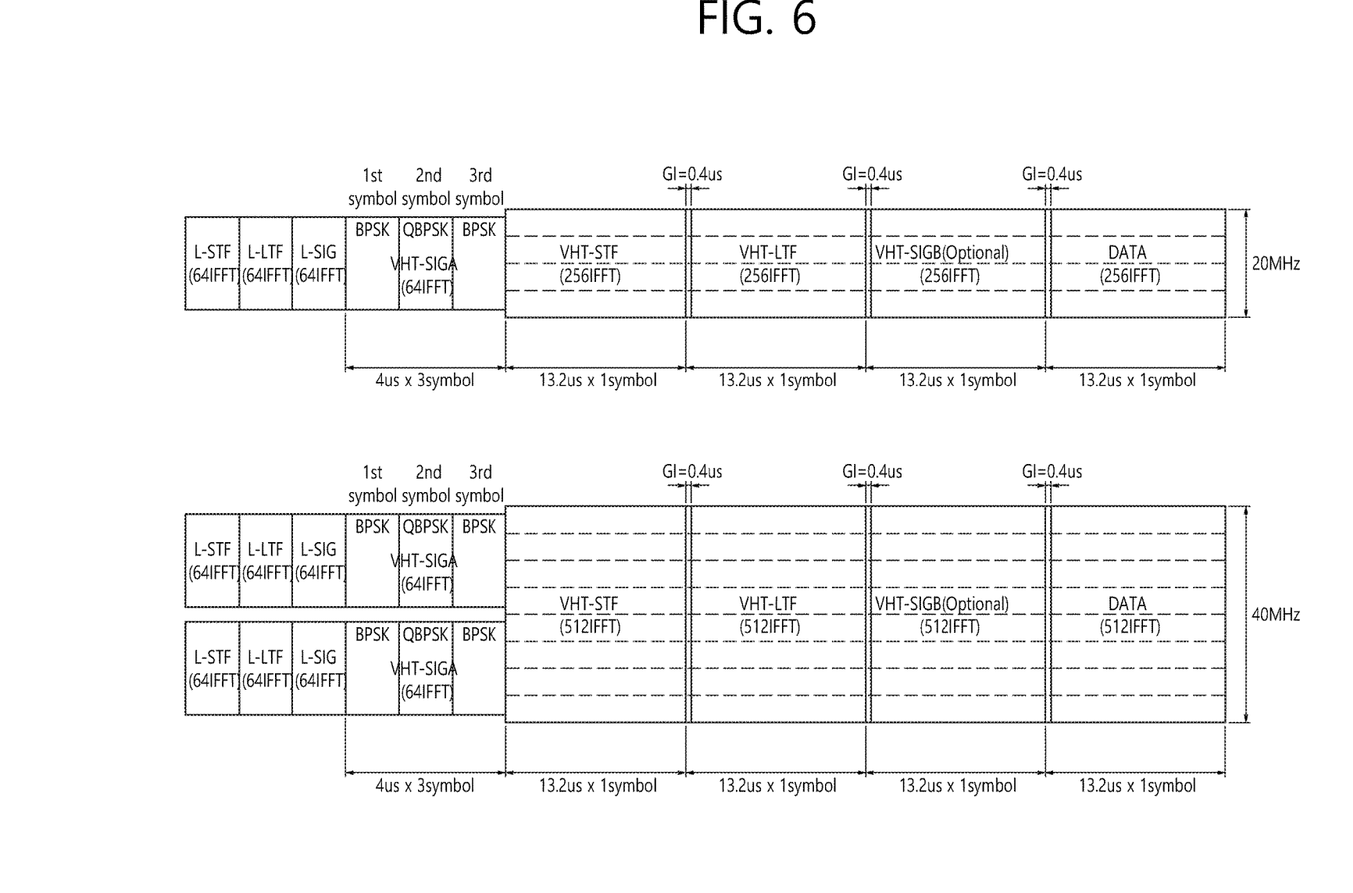
FIG. 6 is a conceptual view illustrating a PPDU supporting a VHT system according to an embodiment of the present invention.

FIG. 6 is a conceptual view illustrating a PPDU supporting a VHT system according to an embodiment of the present invention.

FIG. 6 illustrates a GI with reduced duration between OFDM symbols transmitting a VHT-STF, a VHT-LTF, a VHT-SIG-B, and a DATA field generated based on the 512 IFFT in a PPDU in the VHT system. The duration of the GI may be reduced from 3.2 us to 0.4 us.

When the duration of the GI is reduced from 3.2 us to 0.4 us, duration of an OFDM symbol for each of the VHT-STF, the VHT-LTF, the VHT-SIG-B, and the DATA field is reduced from 16 us to 13.2 us, thus acquiring additional throughput gains. A GI of 0.4 us may be used only for a DATA field transmitted in a 2.4 GHz VHT system.

The L-SIG may carry information on time resources for transmission of VHT related signals (VHT-SIG-A, VHT-STF, VHT-LTF, and VHT-SIG-B) and a DATA field, which are transmitted after the L-SIG, to the STA. A different legacy STA may defer transmission of a PPDU based on the information on the time resources for transmission of the subsequent fields transmitted through the L-SIG, thereby preventing a collision with the PPDU.

Here, the transmission time resources (or PSDU transmission time) protected through the L-SIG may be set assuming that duration of one OFDM symbol is 4.0 us. As described above in FIGS. 5 and 6, the duration of an OFDM symbol for transmission of each of the VHT-STF, the VHT-LTF, the VHT-SIG-B, and the DATA field may be 13.6 us and 13.2 us. Thus, a transmission time for an actually transmitted PSDU may not correspond with a boundary in a 4 us unit.

Table 2 illustrates total OFDM symbol duration, misaligned duration, and signal extension duration according to the number of OFDM symbols when the duration of an OFDM symbol used for transmission of each of the VHT-STF, the VHT-LTF, the VHT-SIG-B, and the DATA field may be 13.6 us and 13.2 us.

TABLE 2

| Number of OFDM Symbols | Total OFDM Symbol Duration (13.6 us) | Misaligned Duration (13.6 us) | Signal Extension Duration (13.6 us) |
|---|---|---|---|
| 1 | 13.6 | 1.6 | 2.4 |
| 2 | 27.2 | 3.2 | 0.8 |
| 3 | 40.8 | 0.8 | 3.2 |
| 4 | 54.4 | 2.4 | 1.6 |
| 5 | 68 | 0 | 0 |
| 6 | 81.6 | 1.6 | 2.4 |
| 7 | 95.2 | 3.2 | 0.8 |
| 8 | 108.8 | 0.8 | 3.2 |
| 9 | 122.4 | 2.4 | 1.6 |
| 10 | 136 | 0 | 0 |

TABLE 3

| Number of OFDM Symbols | Total OFDM Symbol Duration (13.2 us) | Misaligned Duration (13.2 us) | Signal Extension Duration (13.2 us) |
|---|---|---|---|
| 1 | 13.2 | 1.2 | 2.8 |
| 2 | 26.4 | 2.4 | 1.6 |
| 3 | 39.6 | 3.6 | 0.4 |
| 4 | 52.8 | 0.8 | 3.2 |
| 5 | 66 | 2 | 2 |
| 6 | 79.2 | 3.2 | 0.8 |
| 7 | 92.4 | 0.4 | 3.6 |
| 8 | 105.6 | 1.6 | 2.4 |
| 9 | 118.8 | 2.8 | 1.2 |
| 10 | 132 | 0 | 0 |

Table 2 illustrates a case where the length of an OFDM symbol is 13.6 us as in FIG. 5, and Table 3 illustrates a case where the length of an OFDM symbol is 13.2 us as in FIG. 6.

That is, misaligned duration which does not correspond with the boundary in the 4 us unit may be determined according to total OFDM symbol duration according to the total number of OFDM symbols. Misaligned duration may represent a degree of misalignment from a symbol boundary based on an OFDM symbol having a 4.0 us duration.

Signal extension duration represents duration for transmission of an additional signal to match the boundary in the 4 us unit with a boundary of the total duration of OFDM symbols.

Referring to Table 2, when the duration of an OFDM symbol is 13.6 us, signal extension duration may be 0.8 us, 1.6 us, 2.4 us, or 3.2 us. That is, the signal extension duration is a multiple of 0.8 us and may be determined based on a function with the number of OFDM symbols as a parameter. When the number of OFDM symbols is n, the signal extension duration may be determined on function 1.6*n mod 4.

Referring to Table 3, when the duration of an OFDM symbol is 13.2 us, signal extension duration may be 0.4 us, 0.6 us, 1.2 us, 1.6 us, 2.0 us, 2.4 us, 2.8 us, 3.2, or 3.6 us. That is, the signal extension duration is a multiple of 0.8 us and may be determined based on a function with the number of OFDM symbols as a parameter. When the number of OFDM symbols is n, the signal extension duration may be determined on function 2.4*n mod 4.

Figure 7:
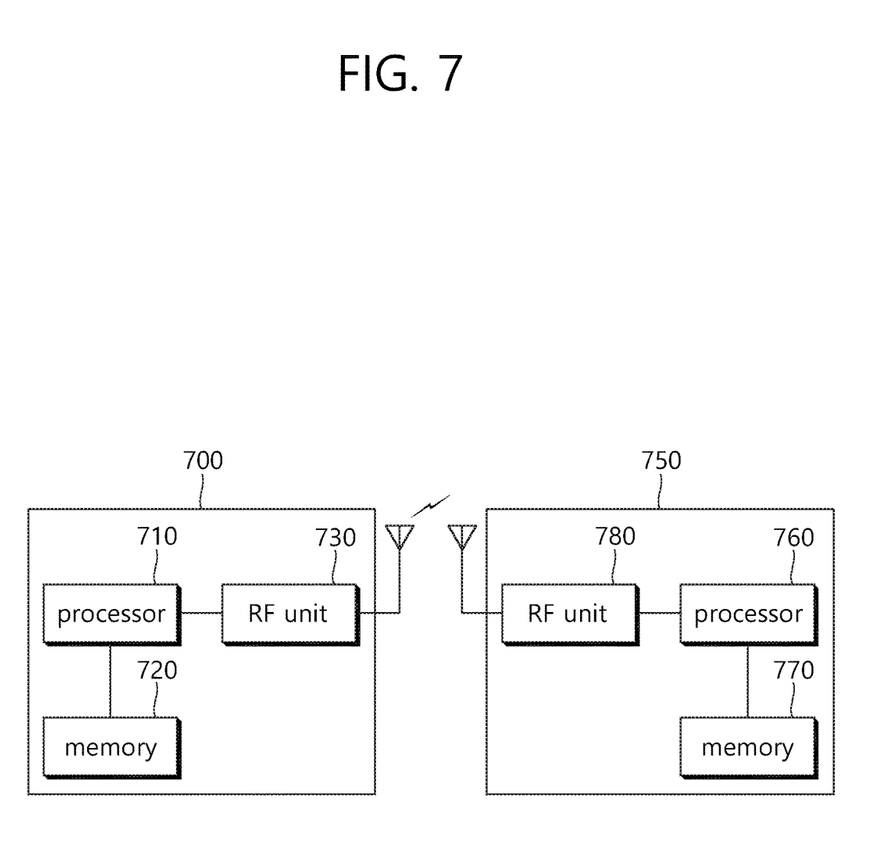
FIG. 7 is a block diagram illustrating a wireless device according to an embodiment of the present invention.

FIG. 7 is a block diagram illustrating a wireless device according to an embodiment of the present invention.

Referring to FIG. 7, the wireless device 700 may be an STA to implement the foregoing embodiments, which may be an AP 750 or a non-AP STA (or STA) 700.

The STA 700 includes a processor 710, a memory 720, and a radio frequency (RF) unit 730.

The RF unit 730 may be connected to the processor 710 to transmit/receive a radio signal.

The processor 710 may implement functions, processes and/or methods of an STA suggested in the present invention. For example, the processor 710 may be configured to perform operations of a wireless device according to the foregoing embodiments of the present invention. The processor may perform operations of an STA illustrated in the embodiments of FIGS. 3 to 6.

For example, the processor 710 may be configured to generate a PPDU and to transmit the PPDU to the AP, wherein the PPDU may include a first field and a second field, the first field may be transmitted based on a first IFFT, and the second field may be transmitted based on a second IFFT.

The AP 750 includes a processor 760, a memory 770, and an RF unit 780.

The RF unit 780 may be connected to the processor 760 to transmit/receive a radio signal.

The processor 760 may implement functions, processes and/or methods suggested in the present invention. For example, the processor 760 may be configured to perform operations of a wireless device according to the foregoing embodiments of the present invention. The processor may perform operations of an AP illustrated in the embodiments of FIGS. 3 to 6.

For example, the processor 760 may receive a PPDU and demodulate a field included in the PPDU. The processor 760 may demodulate a first field transmitted based on a first IFFT based on the first FFT, and demodulate a second field transmitted based on a second IFFT based on the second IFFT. The processor 760 may be configured to change an FFT size in a time resource corresponding to a specific OFDM symbol of the first field.

The processors 710 and 760 may include an application-specific integrated circuit (ASIC), other chipsets, a logic circuit, a data processor and/or a converter to convert a baseband signal and a radio signal from one to the other. The memories 720 and 770 may include a read-only memory (ROM), a random access memory (RAM), a flash memory, a memory card, a storage medium and/or other storage devices. The RF units 730 and 780 may include at least one antenna to transmit and/or receive a radio signal.

When the embodiments are implemented with software, the foregoing techniques may be implemented by a module (process, function, or the like) for performing the foregoing functions. The module may be stored in the memories 720 and 770 and be executed by the processors 710 and 760. The memories 720 and 770 may be disposed inside or outside the processors 710 and 760 or be connected to the processors 710 and 760 via various well-known means.

What is claimed is:

1. A station (STA) transmitting a data unit in a wireless local area network (WLAN), the STA comprising:
    a radio frequency (RF) unit configured to transmit or receive a radio signal; and
    a processor selectively connected to the RF unit,
    wherein the processor is configured to generate a physical layer protocol data unit (PPDU) and to transmit the PPDU to an access point (AP),
    wherein the PPDU comprises a first field and a second field,
    wherein the first field includes first type symbols generated based on first inverse fast Fourier transforms (IFFTs), the first type symbols being 4 µs in length,
    wherein the second field includes second type symbols generated based on second IFFTs, the second type symbols being different in length from the first type symbols,
    wherein when a length of the second type symbols is not a multiple of 4 µs, the PPDU further comprises duration extension data having a first length, and
    wherein a sum of a length of the first field and the second field and a first length is a multiple of 4 µs.

2. The STA of claim 1, wherein the first field is transmitted on three symbols based on the first IFFT,
    the three symbols comprise a first symbol, a second symbol, and a third symbol,
    the first symbol is a symbol modulated based on binary phase shift keying (BPSK),
    the second symbol is a symbol modulated based on quadrature binary phase shift keying (QBPSK),
    the third symbol is a symbol modulated based on BPS K, and
    the third symbol is a time resource for changing a size of a fast Fourier transform (FFT).

3. The STA of claim 2, wherein the first IFFTs are 64 IFFTs and the second IFFTs are 256 IFFTs when the PPDU is transmitted through a 20 MHz channel bandwidth, and the first FFTs are 64 IFFTs and the second IFFTs are 512 IFFTs when the PPDU is transmitted through a 40 MHz channel bandwidth.

4. The STA of claim 1, wherein when the length of the second type symbols is 13.6 usec, the first length is determined based on function 1.6*n mod 4,
    wherein when the length of the second type symbols is 13.2 usec, the first length is determined based on function 2.4*n mod 4,
    wherein the n is a total number of the second type symbols.

5. An access point (AP) receiving a data unit in a wireless local area network (WLAN), the AP comprising:
    a radio frequency (RF) unit configured to transmit or receive a radio signal; and
    a processor selectively connected to the RF unit,
    wherein the processor is configured to receive a physical layer protocol data unit (PPDU) from a station (STA),
    wherein the PPDU comprises a first field and a second field,
    wherein the first field includes first type symbols generated based on first inverse fast Fourier transforms (IFFTs), the first type symbols being 4 µs in length,
    wherein the second field includes second type symbols generated based on second IFFTs, the second type symbols being different in length from the first type symbols,
    wherein when a length of the second type symbols is not a multiple of 4 µs, the PPDU further comprises duration extension data having a first length, and
    wherein a sum of a length of the first field and the second field and a first length is a multiple of 4 µs.

6. The AP of claim 5, wherein the first field is transmitted on three symbols based on the first IFFT,
    the three symbols comprise a first symbol, a second symbol, and a third symbol,
    the first symbol is a symbol modulated based on binary phase shift keying (BPSK),
    the second symbol is a symbol modulated based on quadrature binary phase shift keying (QBPSK),
    the third symbol is a symbol modulated based on BPS K, and
    the third symbol is a time resource for changing a size of a fast Fourier transform (FFT).

7. The AP of claim 6, wherein the first IFFTs are 64 IFFTs and the second IFFTs are 256 IFFTs when the PPDU is transmitted through a 20 MHz channel bandwidth, and the first FFTs are 64 IFFTs and the second IFFTs are 512 IFFTs when the PPDU is transmitted through a 40 MHz channel bandwidth.

8. The AP of claim 6, wherein when the length of the second type symbols is 13.6 usec, the first length is determined based on function 1.6*n mod 4,
    wherein when the length of the second type symbols is 13.2 usec, the first length is determined based on function 2.4*n mod 4,
    wherein the n is a total number of the second type symbols.

* * * * *